United States Patent
Minninger

(10) Patent No.: US 7,909,565 B2
(45) Date of Patent: Mar. 22, 2011

(54) TURBOMACHINE, IN PARTICULAR A GAS TURBINE

(75) Inventor: Dieter Minninger, Dinslaken (DE)

(73) Assignee: Siemens Aktiengesellschaft, Munich (DE)

( * ) Notice: Subject to any disclaimer, the term of this patent is extended or adjusted under 35 U.S.C. 154(b) by 27 days.

(21) Appl. No.: 12/418,790

(22) Filed: Apr. 6, 2009

(65) Prior Publication Data

US 2009/0196732 A1    Aug. 6, 2009

Related U.S. Application Data

(62) Division of application No. 10/561,278, filed on Dec. 15, 2005, now Pat. No. 7,534,087.

(30) Foreign Application Priority Data

Jun. 16, 2003 (EP) .................................... 03013648

(51) Int. Cl.
F01D 5/08 (2006.01)
(52) U.S. Cl. ........................... 415/1; 415/115; 416/97 R
(58) Field of Classification Search ................. 60/226.1; 415/115, 1; 416/97 R
See application file for complete search history.

(56) References Cited

U.S. PATENT DOCUMENTS

| 4,184,797 A | 1/1980 | Anderson et al. |
| 4,815,928 A | 3/1989 | Pineo et al. |
| 4,893,984 A | 1/1990 | Davison et al. |
| 4,967,552 A | 11/1990 | Kumata et al. |
| 5,271,711 A | 12/1993 | McGreehan et al. |
| 5,525,032 A | 6/1996 | Kreis et al. |
| 6,267,553 B1 | 7/2001 | Burge |
| 6,382,903 B1 | 5/2002 | Caruso et al. |
| 6,485,255 B1 | 11/2002 | Care et al. |
| 6,836,086 B1 | 12/2004 | Goldberg et al. |
| 7,114,915 B2 * | 10/2006 | Uematsu et al. .............. 415/115 |

FOREIGN PATENT DOCUMENTS

| DE | 665 762 | 10/1938 |
| DE | 960 327 | 3/1957 |
| DE | 1 038 839 | 9/1958 |
| DE | 39 09 606 A1 | 10/1989 |
| DE | 44 11 616 A1 | 10/1995 |
| GB | 2 112 461 A | 7/1983 |

* cited by examiner

*Primary Examiner* — Igor Kershteyn

(57) ABSTRACT

The invention relates to a turbo-machine, in particular to a gas turbine and to a method for accelerating a temperature modification of a rotor shaft rotationally mounted in turbo-machine. The aim of invention is to develop a device and a method for the turbo-machine making it possible to reduce the size of a radial split of the turbo-machine in order to obtain greater degree of efficiency. The inventive turbo-machine comprises a rotor rotationally mounted in the case of the turbo-machine, a feeding channel embodied in the rotor for introducing a fluid and an outlet channel embodied in the rotor for removing fluid. An inlet orifice of the feeding channel is disposed further inside than the outlet orifice of the outlet channel, and arrangement influencing a liquid flow is formed of an actuating device dependent on centrifugal force. Methods for cooling the rotor only by decelerating the gas turbine and for heating the turbo-machine rotor by heating fluid flowing there-through are also disclosed.

6 Claims, 2 Drawing Sheets

TURBOMACHINE, IN PARTICULAR A GAS TURBINE

CROSS REFERENCE TO RELATED APPLICATION

This application is a divisional of U.S. Pat. No. 7,534,087 filed Dec. 15, 2005. The application, U.S. Pat. No. 7,534,087 is the US National Stage of International Application No. PCT/EP2004/005754, filed May 27, 2004 and claims the benefit thereof. The International Application claims the benefits of European Patent application No. 03013648.5 EP filed Jun. 16, 2003, both of the applications are incorporated by reference herein in their entirety.

FIELD OF THE INVENTION

The present invention relates to a turbomachine, in particular a gas turbine with a compressor, having a rotor rotatably mounted in a casing of the turbomachine, having a feed passage arranged in the rotor and intended for feeding a fluid, and having a discharge passage arranged in the rotor and intended for discharging the fluid. Furthermore, it relates to a method of accelerating a temperature change in a rotor rotatably mounted in a turbomachine.

BACKGROUND OF THE INVENTION

The steady-state operation of turbomachines, in particular gas turbines, is known in the prior art. In the endeavor to achieve a high efficiency, modern gas turbines, for example, with regard to their design, are constructed with the smallest possible radial gaps between the rotating elements and the elements arranged in a rotationally fixed position, for example between an inner wall of the flow passage of a gas turbine and moving blades arranged on a rotor of the gas turbine or between the rotor and guide blades arranged on the inner wall of the flow passage.

To set the radial gap, DE 44 11 616 shows a heating/cooling system for a rotor of a turbomachine. The temperature of the rotor is adapted during the transient operation of the turbomachine by virtue of the fact that a fluid affected by temperature can flow through the rotor via the activation of external valves.

Furthermore, U.S. Pat. No. 5,271,711 discloses rotor cooling for a gas turbine. Extending along the rotor is an annular space in which cooling air is directed from the compressor-side end of the rotor to the combustion-chamber-side end. At its outer boundary, the annular space has cooling-air openings in order to direct cooling air into the intermediate spaces formed by rotor disks. During the load operation of the gas turbine, the cooling air cools the intermediate spaces of the rotor disks.

The rotor-disk cooling of a gas turbine during the load operation has also been disclosed by DE 665 762.

In addition, DE 39 09 606 A1 discloses a rotor for an aircraft gas turbine through which a fluid flow can flow. In order to achieve a minimum loss of efficiency of the power-plant cycle, the rotor is either heated or cooled with the fluid during operation. During operation of the gas turbine, compressor inlet air is extracted from the compressor for cooling the rotor and is directed in the interior of the rotor along a hollow shaft and is discharged at the outlet of the turbine. To heat the rotor, compressed and thus already heated compressor air is extracted from the compressor downstream of the first compressor stage and is fed via an external valve to a mixing chamber in which the heated and compressed air mixes with the cool compressor inlet air. Hot air then flows through the cooler rotor.

In addition, U.S. Pat. No. 6,382,903 discloses the brief heating of the rotor of a gas turbine after it has been started in order to heat the rotor more quickly. To this end, the final compressor air heated by compression is fed to the rotor.

In addition, it is known that the limits for the reduction in the radial gaps are established by the hot-start problem. The hot-start problem occurs if, during the shutdown, that is to say during the cooling phase, of the gas turbine, the latter is restarted in the not yet completely cooled state. In the process, the rotor may jam in the flow passage, since the casing cools down more quickly than the rotor together with the moving-blade wheels and moving blades arranged on it. The still hot rotor cooling down more slowly cannot follow the thermally induced reductions in the dimensions of the casing. If the radial gaps are dimensioned to be too small, the blades lengthening on account of the centrifugal-force expansions will therefore jam the not yet completely cooled rotor after restarting of the gas turbine. This not only prevents the rotor from being able to rotate but also leads to costly damage to the gas turbine. Furthermore, the operating periods of the gas turbine are reduced, since the predetermined cooling phase must first be effected after the end of the firing of the gas turbine before the gas turbine can be safely restarted.

On the other hand, radial gaps which are dimensioned to be too large lead to an undesirably low efficiency of the gas turbine, since the process gas in the flow passage, in a manner not to be disregarded, flows through the radial gaps without transmitting at least some of its energy to the blades in accordance with the intended purpose.

This disadvantage becomes especially noticeable in gas turbines, since high temperatures prevail here in the flow passage.

But other turbomachines, such as compressors, steam turbines and the like, are also affected by this.

In particular the shutdown and the start-up of a gas turbine require a special procedure for design reasons, since the casing of the turbine and also the rotor shaft together with the elements arranged on it are adapted to thermal changes at a different speed. Special attention is therefore to be paid to the shutdown of a gas turbine on account of the problems explained above. This results in special requirements which must be heeded in order to avoid damage to the gas turbine; thus, inter alia, a minimum size of the radial gaps.

On the one hand, sufficiently large radial gaps are to be provided in order to avoid "constriction" of the rotor shaft with the elements arranged on it, this "constriction" leading to the jamming of the rotor in the casing. On the other hand, large radial gaps lead to the reduction, already mentioned, in the efficiency of the gas turbine. A further important aspect to be taken into account concerns the maintenance of the turbine, since maintenance cannot be carried out until after completion of the cooling phase of the gas turbine. As a rule, the period of time between the end of the firing of the gas turbine and the start of the maintenance work is about 24 hours. During the shutdown, the rotor shaft is continuously rotated at a reduced speed, for example at a speed of about 120 revolutions per minute, in order to shorten the cooling phase.

SUMMARY OF THE INVENTION

An object of the invention, then, is to specify a device and a method with which the gap size of the radial gaps of the turbomachine is reduced in order to achieve a higher efficiency. It is also an object of the invention to specify a turbomachine having a reduced downtime and cooling phase.

To achieve the first-mentioned object with regard to a turbomachine mentioned at the beginning, it is proposed with the present invention that the feeding opening of the feed passage lie radially further on the inside than the outlet opening of the discharge passage, and that the means for influencing the fluid flow be formed by an actuating arrangement dependent upon centrifugal force.

With the present invention, for the first time, the thermal state of the rotor of the turbomachine, i.e. of the rotor shaft together with the elements arranged thereon, can be influenced irrespective of a flow of the working fluid of the turbomachine. During the shutdown, the rotor is driven at a comparatively low speed for cooling the turbomachine, so that, instead of the working fluid, a comparatively low flow flows in the flow passage, this flow merely cooling the rotor externally. In the process, the pressure ratios in the flow passage are changed relative to the load operation in such a way that the inner fluid flow dependent upon the speed of the rotor and flowing through the rotor is only comparatively low. With the invention, a fluid which is intended for adapting the rotor temperature and which effectively cools the rotor during the shutdown can now be fed to the rotor. Since the feeding opening for the cooling fluid lies radially further on the inside than the outlet opening, greater peripheral speeds prevail at the outlet opening than at the feeding opening, so that a suction is produced at the outlet openings in the flow passage and produces a fluid flow in the interior of the rotor. In addition, the fluid in the interior of the rotor flows outward in accordance with a centrifuge due to the centrifugal force acting on the fluid, which additionally accelerates the flow of the fluid outward in the interior of the rotor.

The rotor cools down more quickly due to the improved cooling of the rotor during the rotary operation, as a result of which its thermal expansions are likewise reduced more quickly. As a result, thermal regulation of the rotor which corresponds to an associated casing temperature can be achieved, a factor which permits smaller dimensions of the design-related radial gaps and thus increases the efficiency of the turbomachine during load operation. Energy costs can be saved and the energy output can be increased. The invention has an especially advantageous effect in gas turbines, since especially high temperatures and resulting high temperature differences occur here. In addition, a cooling phase shortened compared with the prior art can be achieved before a renewed hot start of the turbomachine. An acceleration of the temperature change of the rotor can be achieved.

Especially simple control of the fluid flow is provided for by an independent actuating arrangement dependent on centrifugal force. This actuating arrangement may be designed, for example, as a sealing element, a shutoff element or the like. The fluid feed inside the rotor shaft can be influenced with the actuating arrangement for influencing the fluid flow. A plurality of shutoff elements may also be provided so that locations to be thermally regulated can be thermally regulated as desired and independently of one another. It is possible to supply axially spaced-apart regions in the turbomachine with a different fluid quantity in order to be able to take into account an axially different thermal stress.

If the rotor drops below a limit speed during the shutdown, the actuating arrangement opens the feed passage, so that a fluid flow can be set. During the load operation of the turbomachine, the actuating arrangement closes the feed passage, since otherwise, as a result of the pressure level prevailing in the flow passage, a fluid flow would flow from the discharge passage through the rotor to the inlet passage as leakage of the flow medium.

Also in the opposite operating case, when running the gas turbine up to speed, the start-up can be advantageously assisted with the device according to the invention by the rotor shaft with the elements arranged thereon being brought to a corresponding temperature more quickly. If a further predetermined speed of the rotor shaft is exceeded, the actuating arrangement can shut off the fluid feed. The predetermined speed may be selected to be identical or also different for both procedures.

In a further configuration, it is proposed that the means for influencing the fluid flow be connected to the discharge passage via a gap formed between moving-blade wheels and an element projecting axially through the rotor shaft. In particular in gas turbines of larger type of construction, the rotor shaft has axially arranged moving-blade wheels through which, for example, a tie rod or the like projects axially. Gaps may be formed in each case between the tie rod and the moving-blade wheels, through which gap the fluid passes to the locations to be thermally regulated. Additional passages for fluid can be dispensed with. However, the passages may also be cooling passages of a cooling system implemented in the turbomachine.

Furthermore, it is proposed that the discharge passage have a throttle element. Feeding of the fluid in accordance with the requirements can be achieved with the throttle element. In addition, the arrangement of throttle elements results in the fluid being distributed in accordance with the intended purpose to the locations to be thermally regulated. Control means for the fluid feed can be dispensed with. Furthermore, this configuration provides high reliability, since it does not need movable parts. The maintenance cost can be kept low.

In a further configuration, it is proposed that the discharge passage open into the flow passage of the turbomachine. Additional discharge means for discharging the fluid after the flow through the locations to be thermally regulated can be dispensed with. The invention may also be advantageously provided at a low cost in already existing turbomachines.

In an advantageous development, it is proposed that, to discharge the fluid from the rotor, the discharge passage open into the flow passage between moving-blade wheels arranged on the rotor shaft. Additional design measures for discharging the fluid can be dispensed with. Simple implementation of the arrangement in already existing designs can be achieved.

If the turbomachine is designed as a gas turbine, the feed may be provided at the compressor-side end of the rotor shaft. Thus cool fluid can be extracted in an especially simple manner from the inflow region of the compressor for cooling the rotor.

Furthermore, a method of cooling a rotor, through which a cooling fluid can flow, of a turbomachine, in particular a gas turbine with a compressor, is proposed with the invention, a fluid for cooling the rotor flowing through the latter during a rotary operation following the load operation of the turbomachine.

The cooling phase of the turbomachine can be considerably shortened by the cooling. This leads during maintenance work to a reduction in downtimes and thus to a reduction in associated costs. In addition, the availability of the turbomachine can be markedly increased. Furthermore, the risk of jamming of the rotor of a gas turbine during a hot start and damage caused as a result can be further reduced. Especially at a low speed of the rotor shaft, a cooling effect of a cooling system implemented in the turbomachine is often not sufficient. A remedy can be provided here by the present solution.

The rotor shaft can therefore be brought to the desired temperature much more rapidly than hitherto. The invention may also be used for the thermal regulation, that is to say for setting the temperature, of the entire rotor shaft and/or of the elements arranged on it, such as moving blades and the like.

In a further configuration, it is proposed that a fluid for heating the rotor flow through the latter during a start-up operation carried out before the load operation of the turbomachine. It is thus possible, for example, for a turbomachine stored at very low temperatures to be heated during the start-up operation, a factor which permits rapid heating of the rotor.

In order to further improve, for example, the start-up of a turbomachine with a predetermined efficiency, it is proposed that a fluid flow for heating the rotor shaft be made possible during a start-up operation carried out before the load operation of the gas turbine and that the means control the fluid flow in such a way that a fluid flow is prevented during the load operation of the turbomachine. Thus the temperature of the rotor shaft and of the elements arranged on it can be advantageously adapted to the temperature of the casing. The radial gaps provided from the design point of view between rotating and nonrotating elements can be further reduced. In addition, the risk of jamming can also be reduced here and a working-medium leakage flowing through the rotor can be prevented.

Furthermore, it is proposed that the fluid used be air. The use of air provides a cost-effective fluid which can be used for the thermal regulation, for both cooling and heating. In particular in gas turbines which already have a cooling system provided for air, this cooling system may also be used for the method according to the invention. In addition, compared with other fluids, air has the advantage that no special requirements with regard to physical or chemical stresses are to be taken into account in conventional gas turbines.

BRIEF DESCRIPTION OF THE DRAWINGS

Further advantages and features can be gathered from the description below of the exemplary embodiments. Components which are essentially the same are designated with the same reference numerals. Furthermore, with regard to identical features and functions, reference is made to the description with respect to the exemplary embodiment in FIG. 1.

In the drawing.

DETAILED DESCRIPTION OF THE INVENTION

Figure 1:
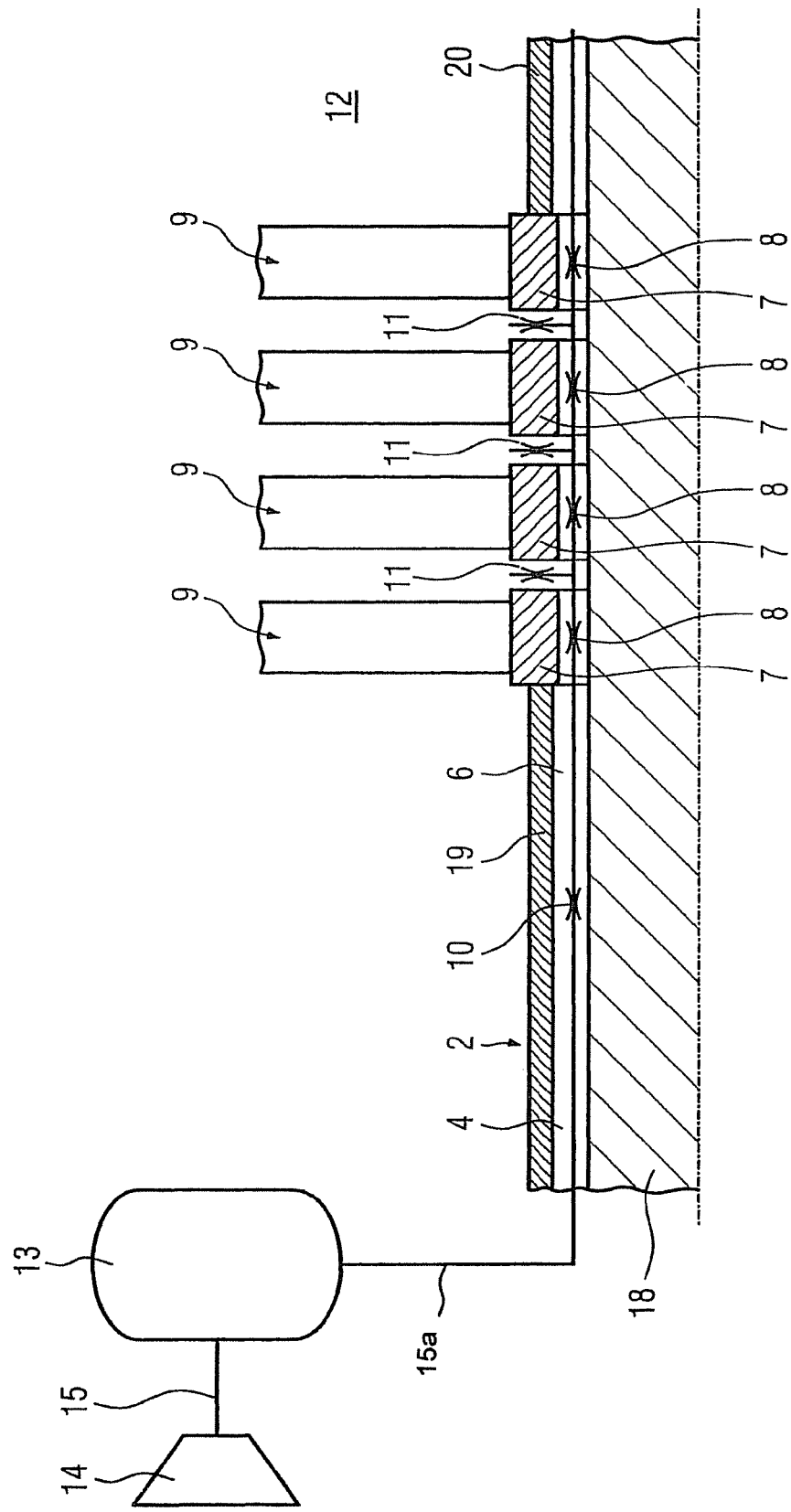
FIG. 1 shows a schematic circuit diagram of an air supply according to the invention for a gas turbine.

Schematically shown in FIG. 1 is a compressor 14 which draws in air, compresses it and feeds it to a compressed-air tank 13 via a line 15. The compressed-air tank 13 is fluidically connected via a line 15a to a feed passage 4 arranged in the rotor shaft 2. The feed passage 4 ends at a shutoff element 10, which is actuated as a function of the speed of the rotor shaft 2 via an actuating mechanism which is arranged in the rotor shaft 2 and is not shown in any more detail. Furthermore, the shutoff element 10 is connected to further passages which are formed by gaps 8 and are in turn fluidically connected to throttle elements 11. The outlets of the throttle elements 11 open between guide-blade wheels 7 into the flow passage 12 of the gas turbine 3.

Figure 2:
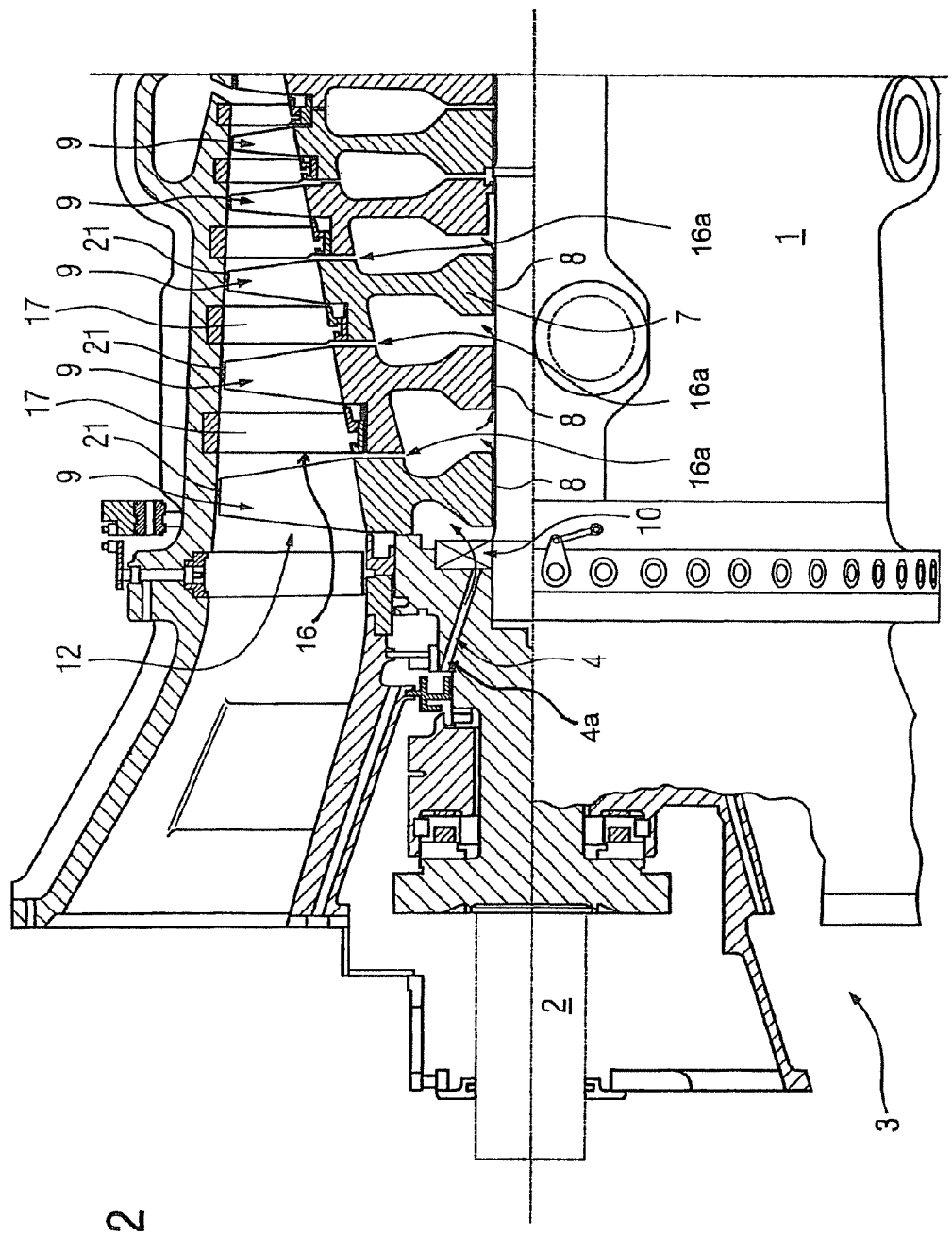
FIG. 2 shows a partly sectioned view of a gas turbine having a cooling-air supply according to the invention.

FIG. 2, in a partly sectioned view, shows a detail of a gas turbine 3 in the region of the compressor inlet. The gas turbine 3 has a casing 1 and a rotor shaft 2 rotatably mounted therein. In a compressor, guide blades 17 connected to the casing are arranged between the moving blades 9 arranged on the moving-blade wheels 7. Arranged in the rotor shaft 2 is a controllable shutoff element 10 which can be supplied with cooling air via a feed passage 4 which has a feeding opening 4a and is likewise arranged in the rotor shaft 2. Via an actuating element which is not shown in any more detail and can be controlled by a centrifugal force, the shutoff element 10 can be switched over between the open state and the closed state. The actuating element is in this case designed in such a way that it switches the shutoff element 10 into the open state when the speed drops below a predetermined value. When the predetermined speed is exceeded, the shutoff element 10 is closed. Alternatively, the speeds initiating an actuation may also deviate from one another.

The rotor shaft 2 has a center hollow shaft 19 (FIG. 1) and a rear hollow shaft 20, between which the moving-blade wheels 7 of the compressor are arranged. Not shown is the fact that the moving-blade wheels 7 of the turbine, which are designed in a similar manner to those of the compressor, follow after the rear hollow shaft 20. The hollow shafts 19, 20 of the moving-blade wheels 7 are operatively connected to one another in a rotationally fixed manner by means of a tie rod 18 projecting through the hollow shafts 19, 20 and the moving-blade wheels 7. Via gaps 8 which are connected to the feed passage 4 and are inherently present, the cooling air is directed from the shutoff element 10 to the throttle elements 11. The throttle elements 11 arranged in the compressor are designed in such a way that the throttle effect decreases with increasing axial distance from the shutoff element 10 in order thus to compensate for pressure losses in the feeding of the cooling air via the gaps 8. Adjoining the throttles 11 are discharge passages 16 which are arranged between the moving-blade wheels 7 and which direct the cooling air into the flow passage 12 of the gas turbine 3 via their outlet opening 16a.

The outlet openings 16a of the discharge passages 16 are arranged radially further on the outside than the feeding openings 4a of the feed passage 4.

In order to shut down the gas turbine 3 from an energy-generating operating state, first of all the fuel feed to the gas turbine 3 is shut off.

With decreasing speed, the self-cooling of the gas turbine 3 also decreases and the pressure ratios in the compressor and also in the turbine change substantially. If the rotor shaft 2 drops below the predetermined speed, the shutoff element 10 switches over to throughflow via the actuating element so that the air passes through the feed passage 4 via the gaps 8 to the throttle elements 11. The throttle elements 11 produce an axial pressure distribution in the compressor, so that, the further away the moving-blade wheels 7 of the compressor are from the actuating element, the greater the amount of cooling air which can be admitted to them. In the turbine, less cooling air is admitted to the moving-blade wheels 7 which are further away from the actuating element than to the moving-blade wheels which are closer to the actuating element. Thus, the rotor disks which are close to the combustion chamber and are subjected to higher thermal loading during the gas turbine operation are preferably cooled during the rotary operation. From the throttle elements 11, the air passes into the flow passage 12 of the gas turbine 3 via outflow passages 16 arranged between adjacent moving-blade wheels 7.

During the shutdown, the centrifugal force causes an acceleration of the air outward in the rotor. The air flows past the moving-blade wheels 7, absorbs the rotor heat in the process and leaves the rotor through the outlet openings 16a. In the process, through the open actuating element, the outflowing air draws in fresh, cooler and not yet heated air through the feeding opening 4a. The suction effect is intensified due to the peripheral speed which occurs at the outlet opening 16a and which is greater than that at the feeding opening 4a. This ensures a reliable discharge of the heated cooling air and a sufficient subsequent flow of fresh, unused cooling air, irrespective of whether there is a possible external compressed-air supply or not.

On account of the cooling effect, the cooling phase or the shutdown, until maintenance work is carried out or until a renewed hot start, can be considerably reduced. Furthermore, the radial gaps 21 can also be designed to be considerably smaller, since a risk of jamming due to quicker cooling of the casing 1 relative to the rotor shaft 2 is prevented by the cooling according to the invention. The rotor shaft 2 together with the elements arranged on it can therefore follow the cooling of the casing 1. In addition, this also has an advantageous effect during the start-up of the gas turbine 3.

The exemplary embodiments shown in the figures merely serve to explain the invention and do not restrict it. Thus, in particular the arrangement of both the passages and the shutoff element or also the number of passages and shutoff elements may be varied in accordance with the requirements without departing from the scope of protection of the invention. The use of fluids other than air, such as, for example, nitrogen, carbon dioxide or even liquids, may be provided without departing from the scope of protection of the invention. In particular, a combination of an already existing cooling system with the present invention is also included.

In addition, the present invention is not restricted to use in gas turbines. It may of course also be used in steam turbines, compressors and the like.

The invention claimed is:

1. A method of cooling a rotor of a turbo-machine having a compressor, comprising:
    flowing a cooling flow of a fluid through the rotor of the turbo-machine during a rotary operation following a load operation of the turbo-machine,
    providing the cooling flow through a feed passage arranged at the compressor-side end of a rotor shaft of the rotor; and
    influencing the cooling flow using an actuating arrangement,
    wherein the cooling flow is prevented during the load operation of the turbo-machine,
    wherein the actuating arrangement is in fluid connection with a plurality of discharge passages, used to discharge the cooling flow, via gaps formed between a plurality of moving-blade wheels and an element projecting axially through the rotor shaft of the rotor, and
    wherein each of the plurality of discharge passages includes a throttle element for controlling an amount of the cooling flow flowing through a respective one of the plurality of discharge passages,
    wherein at least a portion of the plurality of throttle elements are configured to provide a decreased amount of the cooling flow into a respective one of the plurality of discharge passages with increased axial distance from the actuating arrangement relative to an upstream throttle element.

2. The method of cooling a rotor of a turbo-machine having a compressor as claimed in claim 1, further comprising:
    wherein at least a portion of the plurality of throttle elements are configured to provide a decreased amount of the cooling flow into a respective one of the plurality of discharge passages with increased axial distance from the actuating arrangement relative to an upstream throttle element.

3. The method of cooling a rotor of a turbo-machine having a compressor as claimed in claim 1, where the cooling flow is influenced by a shutoff element that is actuated as a function of a speed of the rotor shaft.

4. A method of heating a rotor of a turbo-machine having a compressor, comprising:
    flowing a fluid for heating the rotor, through the turbo-machine during a start-up operation carried out before the load operation of the turbo-machine;
    providing the fluid through a feed passage arranged at the compressor-side end of a rotor shaft of the rotor; and
    influencing the fluid using an actuating arrangement,
    wherein the actuating arrangement in fluid connection with a plurality of discharge passages, used to discharge the fluid, via gaps formed between a plurality of moving-blade wheels and an element projecting axially through the rotor shaft of the rotor,
    wherein each of the plurality of discharge passages includes a throttle element for controlling an amount of the fluid flowing through a respective one of the plurality of discharge passages,
    wherein at least a portion of the plurality of throttle elements are configured to provide a decreased amount of the fluid into a respective one of the plurality of discharge passages with increased axial distance from the actuating arrangement relative to an upstream throttle element,
    wherein the flow of the fluid is prevented during the load operation of the turbo-machine.

5. The method of heating a rotor of a turbo-machine having a compressor as claimed in claim 4,
    wherein at least a portion of the plurality of throttle elements are configured to provide a decreased amount of the fluid into a respective one of the plurality of discharge passages with increased axial distance from the actuating arrangement relative to an upstream throttle element.

6. The method of heating a rotor of a turbo-machine having a compressor as claimed in claim 4, wherein the fluid flow is influenced by a shutoff element that is actuated as a function of a speed of the rotor shaft.

* * * * *